United States Patent
Tsou et al.

(10) Patent No.: US 9,501,691 B2
(45) Date of Patent: Nov. 22, 2016

(54) METHOD AND APPARATUS FOR DETECTING BLINK

(71) Applicant: UTECHZONE CO., LTD., New Taipei (TW)

(72) Inventors: Chia-Chun Tsou, New Taipei (TW); Chia-We Hsu, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 45 days.

(21) Appl. No.: 14/631,851

(22) Filed: Feb. 26, 2015

(65) Prior Publication Data

US 2016/0104036 A1    Apr. 14, 2016

(30) Foreign Application Priority Data

Oct. 13, 2014   (TW) .............................. 103135357 A

(51) Int. Cl.
 *G06K 9/34*    (2006.01)
 *G06K 9/00*    (2006.01)
 *G06K 9/46*    (2006.01)

(52) U.S. Cl.
 CPC ....... *G06K 9/00315* (2013.01); *G06K 9/00604* (2013.01); *G06K 9/4661* (2013.01)

(58) Field of Classification Search
 CPC .................... G06K 9/00281; G06K 9/00335; G06K 9/00597; G06K 9/4609; G06K 9/4661; G06K 9/6212; G06T 2207/10016; G06T 7/0022
 See application file for complete search history.

(56) References Cited

U.S. PATENT DOCUMENTS

| | | | | |
|---|---|---|---|---|
| 5,867,587 A | * | 2/1999 | Aboutalib | G08B 21/06 340/576 |
| 6,927,694 B1 | * | 8/2005 | Smith | B60K 28/066 340/573.1 |
| 8,435,188 B2 | * | 5/2013 | Ohue | A61B 3/14 348/78 |
| 2006/0147094 A1 | * | 7/2006 | Yoo | G06K 9/00604 382/117 |

FOREIGN PATENT DOCUMENTS

| | | |
|---|---|---|
| JP | 2003263629 | 9/2003 |
| JP | 2009005251 | 1/2009 |
| JP | 2009116797 | 5/2009 |

OTHER PUBLICATIONS

Office Action of Japan Counterpart Application, issued on Jul. 26, 2016, p. 1-p. 3.

* cited by examiner

*Primary Examiner* — Phuoc Tran
(74) *Attorney, Agent, or Firm* — Jianq Chyun IP Office

(57) ABSTRACT

A method and an apparatus for detecting blink are provided. After obtaining an eye image sequence of a user, a currently analyzed image and a previously captured image are obtained from the eye image sequence and reflective regions of the currently analyzed image and the previously captured image are filtered, wherein the brightness values of pixels included in the reflective regions are higher than a brightness threshold. Difference pixel amount between the currently analyzed image and the previously captured image is calculated so as to determine whether the user blinks according to the difference pixel amount.

10 Claims, 5 Drawing Sheets

METHOD AND APPARATUS FOR DETECTING BLINK

CROSS-REFERENCE TO RELATED APPLICATION

This application claims the priority benefit of Taiwan application serial no. 103135357, filed on Oct. 13, 2014. The entirety of the above-mentioned patent application is hereby incorporated by reference herein and made a part of this specification.

BACKGROUND

Technical Field

The invention relates to an eye tracking technique, and particularly relates to a method and an apparatus for detecting blink.

Related Art

Current eye tracking technique mainly includes an invasive eye tracking technique and a non-invasive eye tracking technique. The invasive eye tracking technique is to set a search coil in the eye or to use an electrooculogram. The non-invasive eye tracking technique includes a free-head eye tracking technique and a head-mount eye tracking technique. Along with development of technology, the eye tracking technique is widely applied to various fields, for example, neuroscience, psychology, industrial engineering, human factors engineering, marketing advertising, computer science, etc.

In the eye tracking technique, a detection rate is liable to be influenced by an external environment. For example, if a user wears a pair of glasses, a reflect light produced by a lens of the glasses by reflecting an external light source is liable to influence a detection process. Moreover, if the user is in a moving state, a light reflecting position is changed along with the movement. Now, if the conventional technique specified for detecting a single image is used to search the eyes, the detection rate is greatly decreased.

SUMMARY

The invention is directed to a method and an apparatus for detecting blink, by which a light-shadow variation of two images is obtained based on continuous images, so as to determine a blink state of a user.

The invention provides a method for detecting blink, which includes following steps. An eye image sequence of a user is obtained. A currently analyzed image and a previously captured image are obtained from the eye image sequence, wherein a capturing time of the currently analyzed image is different to that of the previously captured image. Reflective regions of the currently analyzed image and the previously captured image are filtered, wherein brightness values of pixels included in the reflective regions are higher than a brightness threshold. A difference pixel amount between the currently analyzed image and the previously captured image is calculated. It is determined whether the user blinks according to the difference pixel amount.

In an embodiment of the invention, the step of calculating the difference pixel amount between the currently analyzed image and the previously captured image includes following steps. A pixel difference between each pixel of the currently analyzed image and each pixel of the previously captured image are calculated. It is determined whether the pixel difference is greater than a first threshold. The difference pixel amount with the pixel value greater than the first threshold is accumulated, so as to determine whether the user blinks according to the difference pixel amount.

In an embodiment of the invention, the step of determining whether the user blinks according to the difference pixel amount includes following steps. It is determined whether the difference pixel amount of each of more than N continuous eye images is greater than a second threshold. It is determined that the user blinks within a time section when the more than N continuous eye images are captured when the difference pixel amount of each of the more than N continuous eye images is greater than the second threshold.

In an embodiment of the invention, the method for detecting blink further includes following steps. An image sequence is captured, wherein the image sequence includes a plurality of continuous raw images. A face detection procedure is executed to each of the raw images, so as to obtain a plurality of face images. A nostril region of each of the face images is detected. Each of the eye images is obtained from each of the face images based on the nostril region.

In an embodiment of the invention, the eye images are respectively gray level images, the previously captured image is an $M^{th}$ image ahead of the currently analyzed image, and M is greater than or equal to 1, and the method for detecting blink further includes a following step. When the currently analyzed image is one of M images with the earliest capturing time in the eye images, the difference pixel amount of the currently analyzed image is not calculated.

The invention provides a blink detection apparatus including an image capturing unit, a storage unit and a processing unit. The image capturing unit is configured to obtain an eye image sequence of a user. The storage unit includes a plurality of modules. The processing unit is coupled to the image capturing unit and the storage unit, and is used for executing the modules. The modules includes a light-shadow analysis module and a blink determination module. The light-shadow analysis module obtains a currently analyzed image and a previously captured image from the eye image sequence, wherein a capturing time of the currently analyzed image is different to that of the previously captured image, and the light-shadow analysis module filters reflective regions of the currently analyzed image and the previously captured image, wherein brightness values of pixels included in the reflective regions are higher than a brightness threshold. The light-shadow analysis module calculates a difference pixel amount between the currently analyzed image and the previously captured image. The blink determination module determines whether the user blinks according to the difference pixel amount.

In an embodiment of the invention, the light-shadow analysis module calculates a pixel difference between each pixel of the currently analyzed image and each pixel of the previously captured image, determines whether the pixel difference is greater than a first threshold, and accumulates the difference pixel amount with the pixel value greater than the first threshold, and the blind determination module determines whether the user blinks according to the difference pixel amount.

In an embodiment of the invention, the blink determination module determines whether the difference pixel amount of each of more than N continuous eye images is greater than a second threshold, and when the difference pixel amount of each of the more than N continuous eye images is greater than the second threshold, the blink determined module determines that the user blinks within a time section when the more than N continuous eye images are captured.

In an embodiment of the invention, the image capturing unit captures an image sequence, wherein the image sequence includes a plurality of continuous raw images. The storage unit further includes a face detection module, a nostril searching module and an eye searching module. The face detection module executes a face detection procedure to each of the raw images, so as to obtain a plurality of face images. The nostril searching module detects a nostril region of each of the face images. The eye searching module obtains each of the eye images from each of the face images based on the nostril region.

In an embodiment of the invention, the eye images are respectively gray level images, the previously captured image is an $M^{th}$ image ahead of the currently analyzed image, and M is greater than or equal to 1. When the currently analyzed image is one of M images with the earliest capturing time in the eye images, the light-shadow analysis module does not calculate the difference pixel amount of the currently analyzed image.

According to the above descriptions, a light-shadow variation (i.e. the difference pixel amount) between two images is obtained based on continuous images, which replaces the original single image processing method, so as to determine a blink state of the user without being influenced by an external environment.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
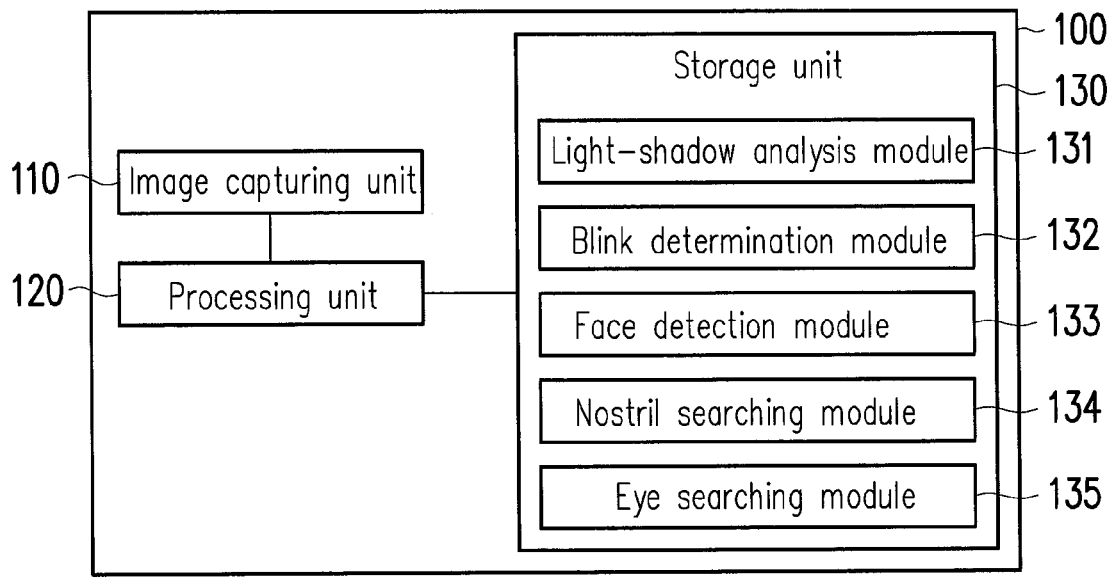
FIG. 1 is a block diagram of a blink detection apparatus according to an embodiment of the invention.

FIG. 1 is a block diagram of a blink detection apparatus according to an embodiment of the invention. Referring to FIG. 1, the blink detection apparatus 100 includes an image capturing unit 110, a processing unit 120 and a storage unit 130. The processing unit 120 is coupled to the image capturing unit 110 and the storage unit 130. The image capturing unit 110 is configured to obtain an eye image sequence (including a plurality of continuous eye images) of a user. The image capturing unit 110 is, for example, a video camera or a camera using a charge coupled device (CCD) lens, a complementary metal oxide semiconductor transistors (CMOS) lens, or an infrared lens.

The processing unit 120 is, for example, a central processing unit (CPU) or a microprocessor, etc. The storage unit 130 is, for example, a non-volatile memory, a random access memory (RAM) or a hard disc, etc. The present embodiment is implemented by program codes. For example, the storage unit 130 stores a plurality of program instructions, and after the program instructions are installed, the processing unit 120 can execute the program instructions. For example, the storage unit 130 includes a plurality of modules, and the modules are used to respectively execute a plurality of functions, and each of the modules is composed of one or a plurality of program instructions. The modules include a light-shadow analysis module 131 and a blink determination module 132.

The light-shadow analysis module 131 performs a light-shadow analysis procedure to each of the eye images to determine a light-shadow variation of each of the eye images. The blink determination module 132 determines a blink state of the user according to the light-shadow variation. In detail, the light-shadow analysis module 131 obtains a currently analyzed image and a previously captured image from the eye image sequence, and calculates a difference pixel amount between the currently analyzed image and the previously captured image, where a capturing time of the currently analyzed image is different to that of the previously captured image. Moreover, the light-shadow analysis module 131 filters reflective regions of the currently analyzed image and the previously captured image, where brightness values of pixels included in the reflective regions are higher than a brightness threshold, in an exemplary embodiment, the brightness threshold ranges between 90 and 200, and in the present embodiment, the brightness threshold can be 100.

Moreover, the storage unit 130 selectively includes a face detection module 133, a nostril searching module 134 and an eye searching module 135. For example, the image capturing unit 110 captures an image sequence including a plurality of raw images. The processing unit 120 obtains the eye images from the raw images through the face detection module 133, the nostril searching module 134 and the eye searching module 135. The face detection module 133 executes a face detection procedure to each of the raw images, so as to obtain a plurality of face images. The nostril searching module 134 detects a nostril region of each of the face images. The eye searching module 135 obtains each of the eye images from each of the face images based on the nostril region.

Figure 2:
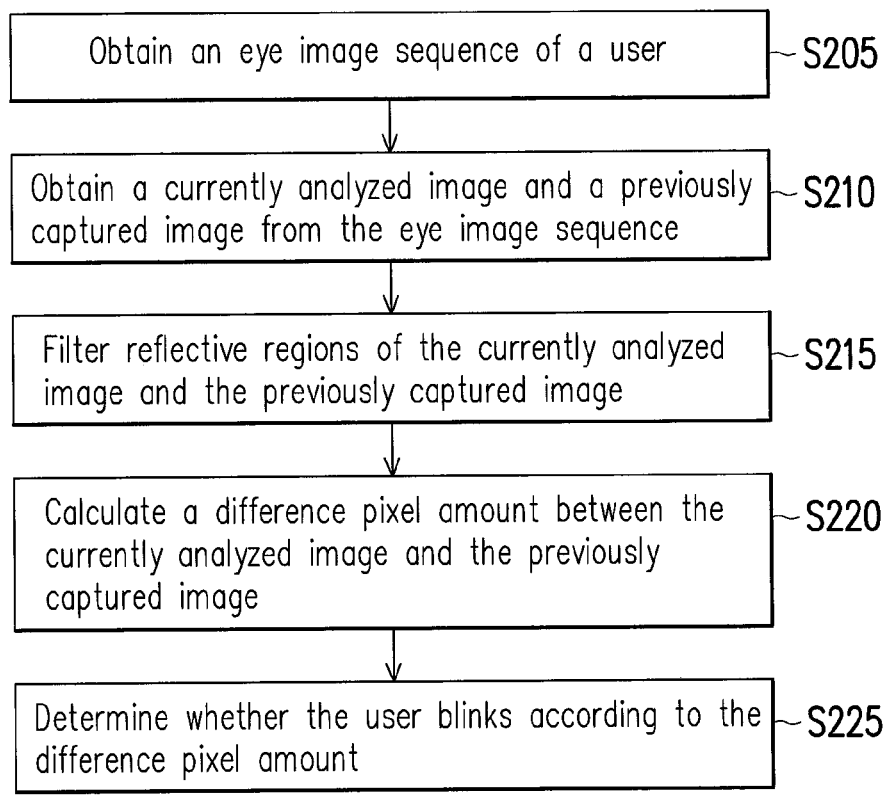
FIG. 2 is a flowchart illustrating a method for detecting blink according to an embodiment of the invention.

FIG. 2 is a flowchart illustrating a method for detecting blink according to an embodiment of the invention. Referring to FIG. 1 and FIG. 2, in step S205, the image capturing unit 110 obtains the eye image sequence of the user. For example, in the present embodiment, the image capturing unit 110 captures a plurality of continuous raw images (including the whole head or including the whole body) of the user, and obtains a plurality of continuous eye images from the raw images. For example, the face detection module 133 respectively executes the face detection procedure to each of the raw images to obtain a plurality of face images. The nostril searching module 134 detects the nostril region of each of the face images. Moreover, the eye searching module 135 obtains each of the eye images from each of the face images based on the nostril region.

The face detection module 133, for example, applies an AdaBoost algorithm or other existing face detection algorithm (for example, to use a Haar-like feature to perform the face detection) to obtain the face images from the raw images. After the face images are obtained, the processing unit 120 searches the nostril region (i.e. a position region where two nostrils are located) in each of the face image to obtain nostril position information through the nostril searching module 134. Nostril position information is, for example, a first center point and a second center point of the two nostrils. Then, the eye searching module 135 obtains the eye image according to the nostril position information. For example, a predetermined range above the first center point and the second center point of the two nostrils is obtained to serve as the eye image.

Moreover, in other embodiments, the image capturing unit 110 is directly used to capture a plurality of continuous eye image of the user. The aforementioned descriptions are only used as examples, and the method of obtaining the eye images is not limited by the invention.

Then, in step S210, the light-shadow analysis module 131 obtains the currently analyzed image and the previously captured image from the eye image sequence, where a capturing time of the currently analyzed image is different to that of the previously captured image.

Then, in step S215, the light-shadow analysis module 131 filters the reflective regions of the currently analyzed image and the previously captured image, where brightness values of pixels included in the reflective regions are higher than the brightness threshold. Moreover, in step S220, the light-shadow analysis module 131 calculates the difference pixel amount between the currently analyzed image and the previously captured image.

For example, the light-shadow analysis module 131 one-by-one obtains one of the eye images from the eye image sequence to serve as the currently analyzed image, and executes the light-shadow analysis procedure to the currently analyzed image and the previously captured image, so as to determine the light-shadow variation between the currently analyzed image and the previously captured image. The light-shadow variation is, for example, a brightness variation between two eye images, and the light-shadow analysis module 131 finds the difference pixel amount with a high brightness variation between the currently analyzed image and the previously captured image.

The capturing time of the previously captured image is earlier than the capturing time of the currently analyzed image. For example, it is assumed that the currently analyzed image is an $X^{th}$ eye image, such that an $(X-4)^{th}$ eye image is taken as the previously captured image to perform the light-shadow analysis procedure. This is because that if two adjacent eye images are applied, brightness distributions of the two adjacent eye images are too similar to cause inapparent light-shadow variation due to too close of the capturing time. Therefore, the $(X-4)^{th}$ eye image is taken as the previously captured image.

Since a light-shadow variation between an eye image with a closed eye and an eye image with an opened eye is higher than a light-shadow variation between eye images both with the opened eye, in the step S220, the difference pixel amount with the high brightness variation between the currently analyzed image and the previously captured image is calculated to serve as a basis for determining the blink.

Finally, in step S225, the blink determination module 132 determines whether the user blinks according to the difference pixel amount.

Figure 3:
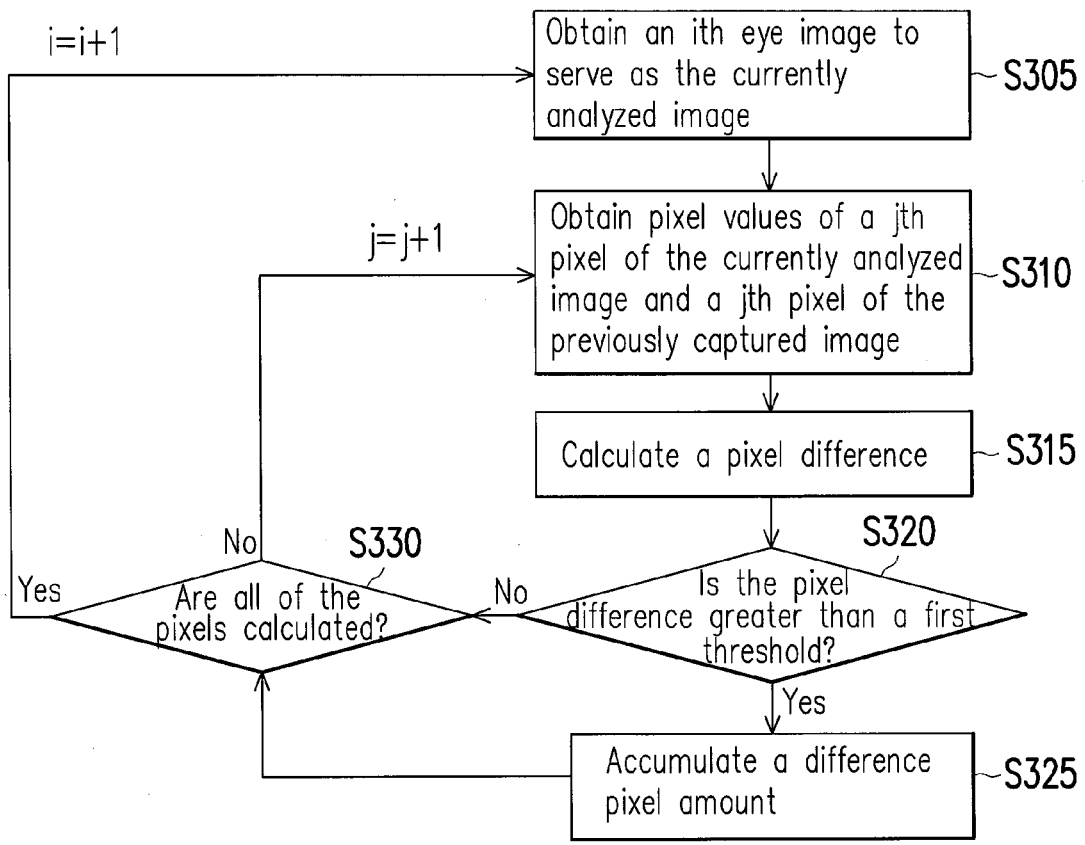
FIG. 3 is a flowchart illustrating a brightness variation analysis procedure according to an embodiment of the invention.

An embodiment is provided below to describe a brightness variation analysis procedure between the currently analyzed image and the previously captured image. FIG. 3 is a flowchart illustrating a brightness variation analysis procedure according to an embodiment of the invention. Referring to FIG. 1 and FIG. 3, in step S305, the light-shadow analysis module 131 obtains an $i^{th}$ eye image to serve as the currently analyzed image, and obtains an $M^{th}$ image ahead of the currently analyzed image (i.e. an $(i-M)^{th}$ eye image) to serve as the previously captured image, where M is greater than or equal to 1. In the present embodiment M=4, i.e. the $(i-4)^{th}$ eye image is taken as the previously captured image. Moreover, the eye images are gray level images, i.e. a pixel value of each pixel is one of brightness values of 0-255. If the raw images captured by the image capturing unit 110 are color images, before the brightness variation analysis procedure is performed, the method further includes a step of converting the color images into the gray level images.

Moreover, if the obtained currently analyzed image is one of M images with the earliest capturing time in the eye images, the light-shadow analysis procedure is not performed to the currently analyzed image and obtains next one of the eye images from the eye image sequence to serve as the currently analyzed image. For example, if M=4, the light-shadow analysis procedure is not performed to the $1^{st}$-$4^{th}$ eye images.

Then, in step S310, the light-shadow analysis module 131 obtains pixel values of a $j^{th}$ pixel of the currently analysed image and a $j^{th}$ pixel of the previously captured image. Here, it is assumed that j=1, and the light-shadow analysis module 131 obtains pixel values of the $j^{th}$ pixels of the currently analysed image and the previously captured image.

Then, in step S315, the light-shadow analysis module 131 calculates a pixel difference between the above two pixel values. In step S320, the light-shadow analysis module 131 determines whether the pixel difference is greater than a first threshold. If the pixel difference is greater than the first threshold, it represents that the brightness variation is large, and in step S325, the light-shadow analysis module 131 accumulates the difference pixel amount. Thereafter, in step S330, the light-shadow analysis module 131 determines whether all of the pixels are calculated.

If the pixel difference is not greater than the first threshold, it represents that the brightness variation is not large, such that the difference pixel amount is not accumulated, and the step S330 is directly executed, by which the light-shadow analysis module 131 determines whether all of the pixels are calculated. If not, j is added by 1 to calculate a next pixel, and the light-shadow analysis module 131 repeatedly executes the steps S310-S325 until all of the pixels are calculated. If calculation of all of the pixels is completed, i is added by 1 to obtain a next eye image to serve as the currently analyzed image, and the light-shadow analysis module 131 repeatedly executes the steps S305-S330. Deduce by analogy, the difference pixel amount corresponding to each of the eye images is obtained.

Moreover, in other embodiments, the light-shadow analysis module 131 can directly subtract the currently analyzed image by the previously captured image to obtain a difference image, and then calculates a difference pixel amount of each pixel with the pixel value greater than the first threshold in the difference image.

Figure 4:
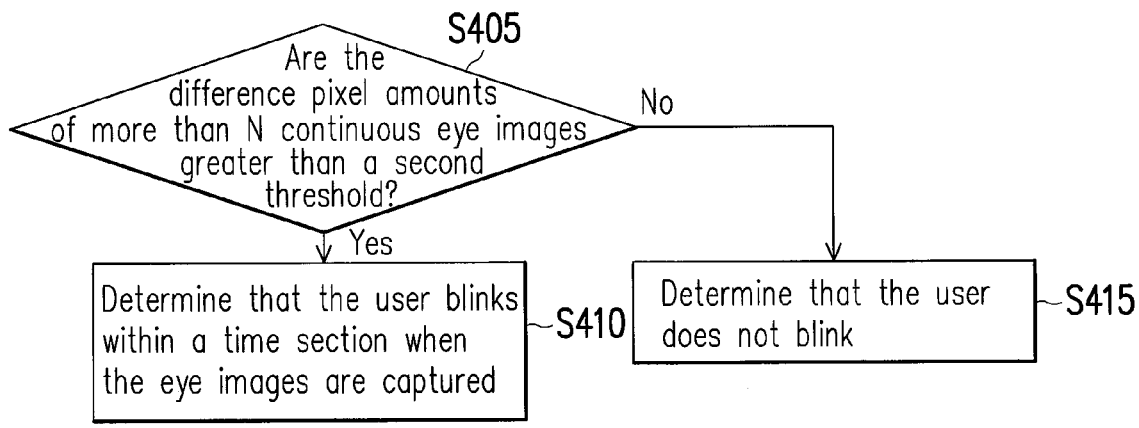
FIG. 4 is a flowchart illustrating a method for determining whether a user blinks according to an embodiment of the invention.

After the difference pixel amount of each eye image is obtained, the blink determination module 132 determines whether the user blinks. For example, FIG. 4 is a flowchart illustrating a method for determining whether the user blinks according to an embodiment of the invention. Referring to FIG. 1 and FIG. 4, in step S405, the blink determination module 132 determines whether the difference pixel amounts of more than N continuous eye images are all greater than a second threshold. Here, the step of setting more than N continuous eye images is to reduce a misjudgement rate of the blink state.

If the difference pixel amounts of more than N continuous eye images are greater than the second threshold, in step S410, the blink determination module 132 determines that the user blinks within a time section when the more than N continuous eye images are captured. If the difference pixel amounts of not more than N continuous eye images are greater than the second threshold, in step S415, the blink determination module 132 determines that the user does not blink.

The light-shadow variation between an eye opening state and a blink state is described below.

Figure 5A:
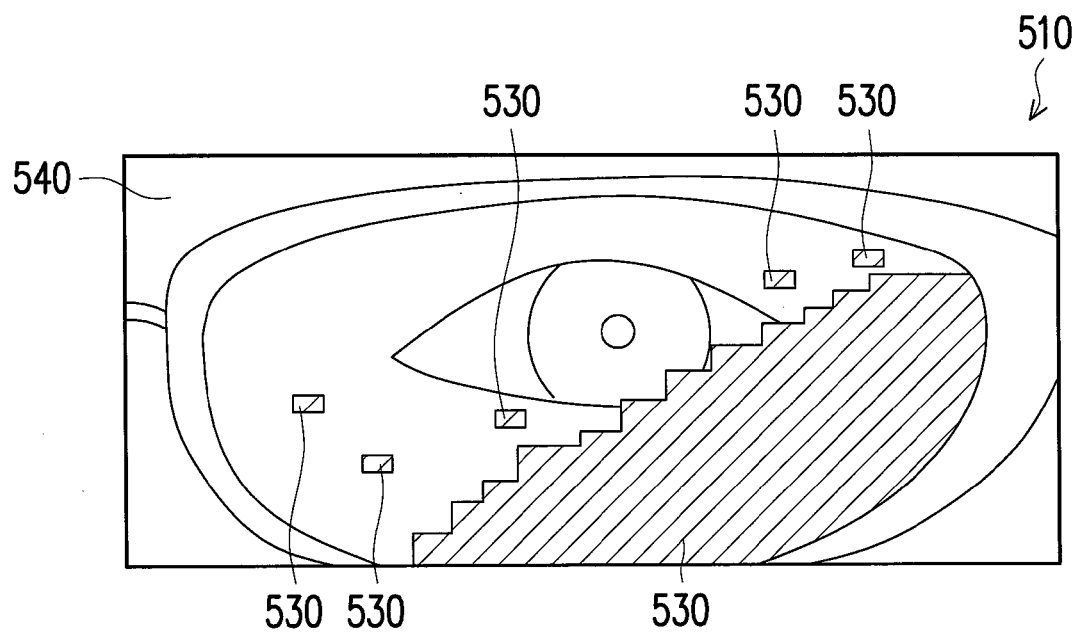
FIG. 5A and FIG. 5B are schematic diagrams of an eye opening state according to an embodiment of the invention.
Figure 5B:
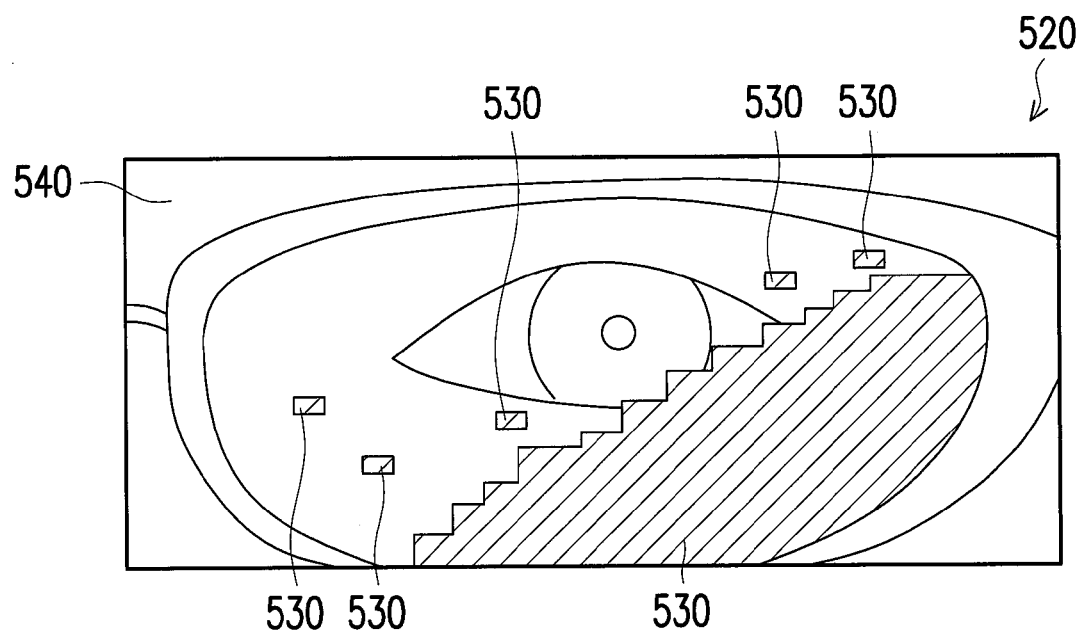

FIG. 5A and FIG. 5B are schematic diagrams of the eye opening state according to an embodiment of the invention. FIG. 5A illustrates a currently analyzed image 510, and FIG. 5B illustrates a previously captured image 520, in which a slash region represents a reflective region 530 in the image, and the other part is a first region 540. In FIG. 5A and FIG. 5B, in case that the user is in the eye opening state, since the currently analyzed image and the previously captured image all include the opened eye, a brightness difference there between is not large, and distributions of the reflective regions thereof are substantially the same. Namely, the light-shadow distributions of the currently analyzed image and the previously captured image are substantially the same. Therefore, the pixel difference between corresponding pixels of the currently analyzed image and the previously captured image is not high.

Figure 6A:
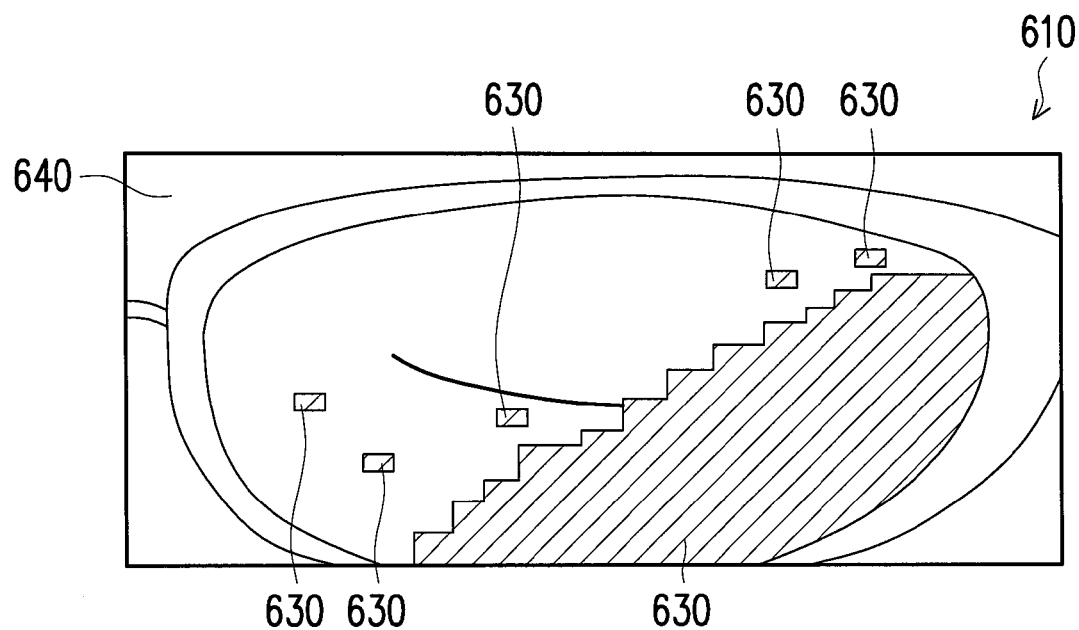
FIG. 6A and FIG. 6B are schematic diagrams of a blink state according to an embodiment of the invention.
Figure 6B:
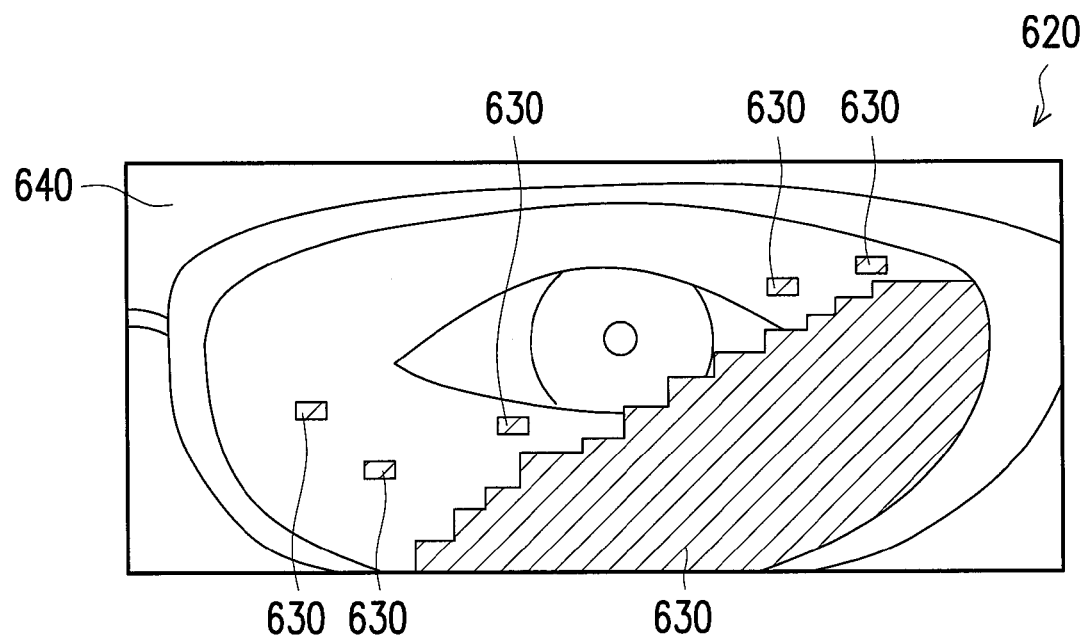

FIG. 6A and FIG. 6B are schematic diagrams of the blink state according to an embodiment of the invention. FIG. 6A illustrates a currently analyzed image 610, and FIG. 6B illustrates a previously captured image 620, in which the slash region represents a reflective region 630 in the image, and the other part is a first region 640. In FIG. 6A and FIG. 6B, in case that the user is in the blink state, a brightness difference between the eyes in the currently analyzed image with an opened eye and the previously captured image with a closed eye is obviously large. Therefore, there are places with large pixel differences in the two tandem (not necessarily adjacent) eye images under the blink state.

Since the reflective regions 630 may influence image analysis, the reflective regions 630 reaching the brightness threshold are filtered, and only the first regions 640 in the currently analyzed image 610 and the previously captured image 620 are considered. Under the eye opening state, the difference pixel amount between the first regions 540 of the currently analyzed image and the previously captured image is relatively small. Conversely, under the blink state, the difference pixel amount between the first regions 540 of the currently analyzed image and the previously captured image is relatively large.

Figure 7:
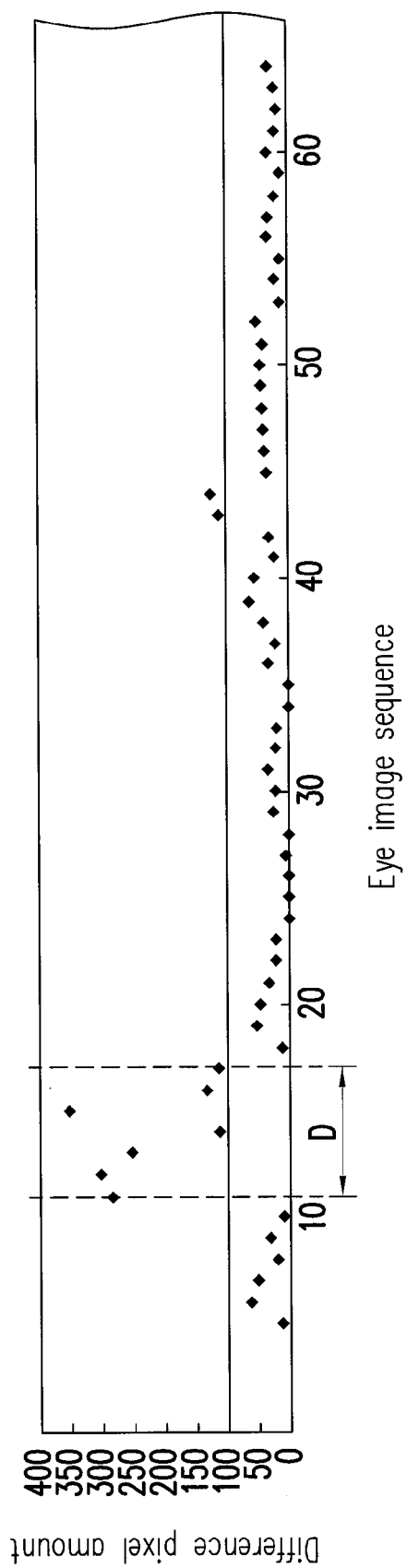
FIG. 7 is a schematic diagram illustrating a relationship between difference pixel amounts of a first region of an eye image sequence according to an embodiment of the invention.

FIG. 7 is a schematic diagram illustrating a relationship between the difference pixel amounts of the first region of the eye image sequence according to an embodiment of the invention, in which a horizontal axis represents the eye image sequence, and the vertical axis represents the difference pixel amounts of the first region in the eye image sequence.

In the present embodiment, it is assumed that the second threshold is 100, and N is 5, though the above assumption is only an example, and the invention is not limited thereto. In FIG. 7, the difference pixel amounts of an $11^{th}$ eye image to a $17^{th}$ eye image are all greater than 100, and the difference pixel amounts of a $43^{rd}$ eye image to a $44^{th}$ eye image are all greater than 100. Since the number of the $11^{th}$ to $17^{th}$ eye images is greater than 5, it represents that the user is in the blink state during a time section D when the continuous $11^{th}$ to $17^{th}$ eye images are captured. Since the number of the $43^{rd}$ to $44^{th}$ eye images is not greater than 5, the user is not in the blink state.

In summary, the light-shadow variation between two images is obtained based on continuous images, which replaces the original single image processing method, so as to determine the blink state of the user without being influenced by an external environment (for example, the user wears a pair of glasses, and the lens reflects light to cause the influence).

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for detecting blink, comprising:
    obtaining an eye image sequence including a plurality of eye images detected from an image sequence of a user;
    obtaining a currently analyzed image and a previously captured image from the eye image sequence;
    filtering reflective regions of the currently analyzed image and the previously captured image, wherein brightness values of pixels included in the reflective regions are higher than a brightness threshold, and the reflective regions are generated by a reflection of an external light source;
    calculating a difference pixel amount between the currently analyzed image and the previously captured image; and
    determining whether the user blinks according to the difference pixel amount.

2. The method for detecting blink as claimed in claim 1, wherein the step of calculating the difference pixel amount between the currently analyzed image and the previously captured image comprises:
    calculating a pixel difference between each pixel of the currently analyzed image and each pixel of the previously captured image;
    determining whether the pixel difference is greater than a first threshold; and
    accumulating the difference pixel amount with the pixel value greater than the first threshold, so as to determine whether the user blinks according to the difference pixel amount.

3. The method for detecting blink as claimed in claim 2, wherein the step of determining whether the user blinks according to the difference pixel amount comprises:
    determining whether the difference pixel amount of each of more than N continuous eye images is greater than a second threshold; and
    determining that the user blinks within a time section when the more than N continuous eye images are captured when the difference pixel amount of each of the more than N continuous eye images is greater than the second threshold.

4. The method for detecting blink as claimed in claim 1, further comprising:

capturing the image sequence, wherein the image sequence comprises a plurality of continuous raw images;

executing a face detection procedure to each of the raw images, so as to obtain a plurality of face images;

detecting a nostril region of each of the face images; and obtaining each of eye images from each of the face images based on the nostril region.

5. The method for detecting blink as claimed in claim 1, wherein the eye images are respectively gray level images, the previously captured image is an $M^{th}$ image ahead of the currently analyzed image, and M is greater than or equal to 1, and the method for detecting blink further comprises:

obtaining next one of the eye images from the eye image sequence to serve as the currently analyzed image when the currently analyzed image is one of M eye images with the earliest capturing time in the eye images wherein the difference pixel amount of the M eye images with the earliest capturing time is not calculated.

6. A blink detection apparatus, comprising:

a camera, obtaining an eye image sequence including a plurality of eye images detected from an image sequence of a user;

a memory including a plurality of modules; and a processor, coupled to the camera and the memory, and executing the modules, wherein the modules include:

a light-shadow analysis module, obtaining a currently analyzed image and a previously captured image from the eye image sequence, wherein a capturing time of the currently analyzed image is different to that of the previously captured image, and the light-shadow analysis module filters reflective regions of the currently analyzed image and the previously captured image, wherein brightness values of pixels included in the reflective regions are higher than a brightness threshold, the reflective regions are generated by a reflection of an external light source, and the light-shadow analysis module calculates a difference pixel amount between the currently analyzed image and the previously captured image; and a blink determination module, determining whether the user blinks according to the difference pixel amount.

7. The blink detection apparatus as claimed in claim 6, wherein the light-shadow analysis module calculates a pixel difference between each pixel of the currently analyzed image and each pixel of the previously captured image, determines whether the pixel difference is greater than a first threshold, and accumulates the difference pixel amount with the pixel value greater than the first threshold, and the blind determination module determines whether the user blinks according to the difference pixel amount.

8. The blink detection apparatus as claimed in claim 7, wherein the blink determination module determines whether the difference pixel amount of each of more than N continuous eye images is greater than a second threshold, and when the difference pixel amount of each of the more than N continuous eye images is greater than the second threshold, the blink determined module determines that the user blinks within a time section when the more than N continuous eye images are captured.

9. The blink detection apparatus as claimed in claim 6, wherein the camera captures the image sequence, wherein the image sequence comprises a plurality of continuous raw images, wherein the memory further comprises:

a face detection module, executing a face detection procedure to each of the raw images, so as to obtain a plurality of face images;

a nostril searching module, detecting a nostril region of each of the face images; and an eye searching module, obtaining each of eye images from each of the face images based on the nostril region.

10. The blink detection apparatus as claimed in claim 6, wherein the eye images are respectively gray level images, the previously captured image is an $M^{th}$ image ahead of the currently analyzed image, and M is greater than or equal to 1, and when the currently analyzed image is one of M images with the earliest capturing time in the eye images, the light-shadow analysis module does not calculate the difference pixel amount of the currently analyzed image.

* * * * *